April 3, 1951  A. A. L. BRUEL  2,547,255
HELICOPTER WITH AUTOMATIC ANTITORQUE VANE
Filed May 10, 1945
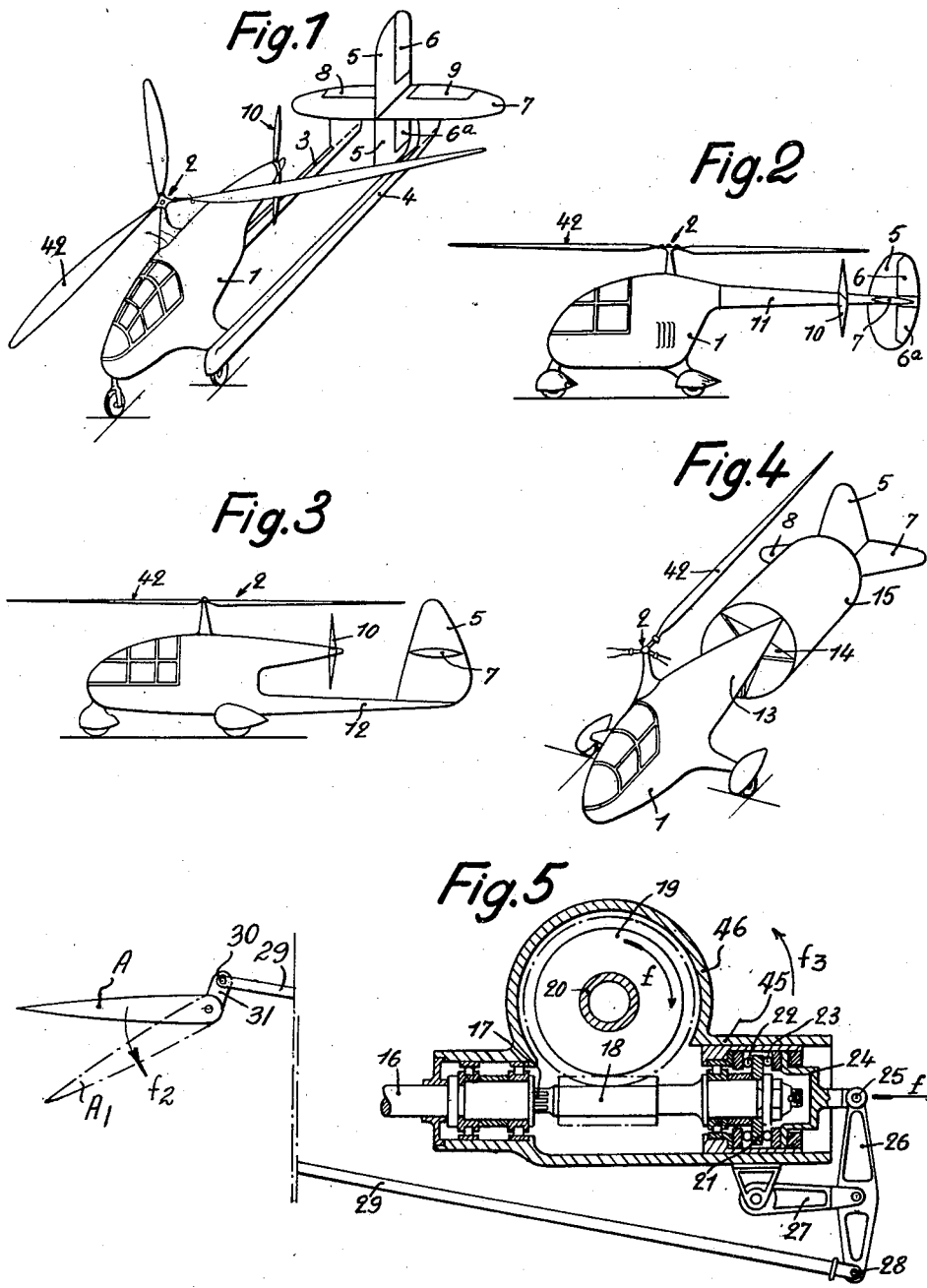
INVENTOR
André Aimé Lucien Bruel
By [signature]
his ATTY.

Patented Apr. 3, 1951

2,547,255

UNITED STATES PATENT OFFICE 2,547,255

HELICOPTER WITH AUTOMATIC ANTITORQUE VANE

André Aimé Lucien Bruel, Paris, France

Application May 10, 1945, Serial No. 593,044
In France December 5, 1942

Section 1, Public Law 690, August 8, 1946
Patent expires December 5, 1962

3 Claims. (Cl. 244—17.19)

The invention relates to aircraft with sustaining airscrews of rotors such as helicopters and Autogiros and more particularly to aircraft of this kind wherein the reaction torque of the rotor or rotors is balanced by a blowing airscrew whose axis is substantially parallel with the longitudinal axis of the aircraft and which is adapted to blow air on to the vertical and horizontal tail airfoils which control the lateral and vertical stability of the aircraft.

The main objects of the invention are:

1. To provide automatic control of the angle of attack of said airfoils in response to the reaction torque of the sustaining airscrew.
2. To provide bodily adjustable horizontal airfoils in combination with a sustaining airscrew having a fixed vertical axis, whereby equilibrium of the aircraft about a horizontal transverse axis will be altered by the adjustment of said horizontal airfoils.
3. To provide a tubular screen between the blowing airscrew and the rear airfoils for preventing deviation of the air stream blown onto said airfoils by gusts of wind.

Further objects and features of the invention will be set forth in the following description, with reference to the accompanying drawings, in which:

Fig. 1 is a perspective view of an aircraft to which the invention can be applied.

Figs. 2 and 3 are elevational views of two modifications.

Fig. 4 is a perspective view of a further modification.

Fig. 5 is a horizontal cross-section of an automatic flap control device operating in response to the reaction torque of the sustaining screw.

Referring to Fig. 1, I denotes the aircraft body and 2 the sustaining airscrew or rotor, which may be driven positively in the case of a helicopter, or which may be loosely rotatable and associated with a propeller (not shown) in the case of an Autogiro. To the aircraft body are secured two girders or beams 3 and 4 adapted to support the tail, formed with a vertical airfoil 5, provided with adjustable flaps 6, 6ª and a horizontal airfoil 7, provided with adjustable flaps 8, 9.

At a suitable distance forwardly of the tail is provided a blowing airscrew 10, whose axis is substantially parallel with the longitudinal axis of the aircraft and which is adapted to blow a stream of air toward the tail, the airfoils being arranged in the fully contracted slipstream. By suitably adjusting the deflection of flaps 6, 6ª, the reaction torque, which would cause the aircraft to spin about the vertical axis of rotor 2 may be exactly balanced. Similarly, by suitably adjusting the deflection of flaps 8, 9, it is possible to alter the balance of the aircraft about the transverse axis passing through the centre of gravity of the aircraft.

Alternatively flaps 6, 8, 9 may be dispensed with, and in such case the airfoils 5, 7 would be adjustably mounted so as to alter their angle of attack.

In the modification of Fig. 2, the tail 5, 7 is supported by a single horizontal girder 11 tapering toward the rear and upon which the blowing airscrew 10 is rotatably mounted. The girder may be tubular to accommodate the control devices for the flaps.

Fig. 3 shows another modification comprising a single girder 12 situated at the lower part of the aircraft body, outside the slipstream blown by the blowing airscrew 10.

In the modification of Figure 4 the blowing airscrew is arranged at the end of an extension 13 of the aircraft body, which, through a spider 14, supports a cylindrical sleeve or Venturi tube 15 enclosing the blowing airscrew 10 and opening adjacent the airfoils 5, 7, 8. Said sleeve may also serve as a structural element for supporting the tail.

According to the invention, the amount of deflection of flaps 6, 6ª (or the angular setting of vertical airfoil 5) necessary for balancing the reaction torque about the vertical axis of the rotor is controlled automatically.

Figure 5 shows by way of example an embodiment of a device for the automatic adjustment of an adjustable vertical flap A in order to balance the reaction torque of the sustaining airscrew.

In this embodiment, a driving shaft 16, actuated by the aircraft engine, is splined to the shaft 17 of a worm 18, the shaft being slidably mounted in the tubular end of shaft 16. Worm 18 meshes with a worm gear 19 keyed to the shaft 20 of airscrew 2. The opposite end of shaft 17 carries a disc 21, held between two thrust bearings 22, 23 in a carriage 24, slidably mounted in a tubular extension 45 of the casing 46 for the mechanism. The end of carriage 24 is pivoted at 25 to a lever 26, adapted to rock about the end of an arm 27 and pivoted at its opposite end at 28 to a rod 29; this latter is pivoted in turn at 30 to a lug 31 of flap A.

It will be seen that, if shaft 20 is rotated by shaft 16 in the direction of arrow f, the torque reaction will tend to move carriage 24 in the direction of arrow $f_1$, and, through lever, link 29 and lug 31, to deflect flap A to the position $A_1$ in the direction of arrow $f_2$. This deflection will produce a certain aerodynamic resultant of the action of the slipstream of blowing airscrew 10 and/or of the relative wind, acting on flap A in the direction contrary to arrow $f_2$ and counteracting the tendency of the aircraft to spin in the direction $f_3$. If the torque increases, tending to cause the aircraft to spin about the axis of shaft 20, in the direction of arrow $f_3$, worm 18 tends to move further in the direction of arrow $f_1$, thus increasing the deflection of flap A and the aerodynamic balancing force or hinge moment of said flap. Thus, by a suitable adjustment of the leverages and angular setting of the elements of the transmission, the action on the vertical flaps A of the slipstream or relative wind will determine a moment about the axis of the sustaining airscrew, balancing the reaction torque.

Obviously the worm connection 18, 19 should be reversible and might be replaced by any other torque responsive device to obtain the necessary deflection of flaps A.

The mechanical control could be replaced by a hydraulic, pneumatic or electric control.

The vertical and horizontal airfoils may have a thin symmetrical profile or a slight or medium camber, and the flaps may be slotted or not. However, the vertical airfoil or airfoils will preferably have a profile with a rather strong lift coefficient, provided with slotted flaps and eventually with slots on the leading edge. Hand-adjustment of the flaps 6, $6^a$ or airfoils 5 will be controlled in a conventional manner from the cockpit.

Obviously the invention is not limited to the embodiments above described, which have been given solely by way of example.

Having now described my invention what I claim as new and desire to secure by Letters Patent is:

1. In an aircraft, an aircraft body, a sustaining airscrew, a substantially vertical shaft for said sustaining airscrew, a driving shaft, means for operatively connecting said driving shaft with said vertical shaft, an axially movable member associated with said connecting means for moving in relation with the value of the torque of said vertical shaft, a blowing airscrew rotatable about an axis substantially parallel with the longitudinal axis of said body, a vertical airfoil, a flap hinged to said airfoil, and means controlled by said movable member for adjusting said flap.

2. In an aircraft, an aircraft body, a sustaining airscrew, a substantially vertical shaft for said sustaining airscrew, a driving shaft, an axially movable shaft splined to said driving shaft, a worm keyed to said axially movable shaft, a worm wheel keyed to said vertical shaft and engaging said worm, a blowing airscrew rotatable about an axis substantially parallel with the longitudinal axis of said body, a vertical airfoil, a flap hinged to said airfoil, and means for operatively connecting said flap to said axially movable shaft whereby the aerodynamic forces exerted on said flap will counteract the torque exerted on said worm.

3. In an aircraft, an aircraft body, at least one sustaining airscrew rotatable about a substantially vertical axis, at least one blowing airscrew rotatable about an axis substantially parallel with the longitudinal axis of the aircraft, an adjustable vertical airfoil in the slipstream of said blowing airscrew and means, responsive to the reaction torque of said sustaining airscrew, for adjusting said vertical airfoil and balancing said torque.

ANDRÉ AIMÉ LUCIEN BRUEL.

REFERENCES CITED

The following references are of record in the file of this patent:

UNITED STATES PATENTS

| Number | Name | Date |
|---|---|---|
| 1,811,303 | De la Cierva | June 23, 1931 |
| 1,887,703 | Vaughn | Nov. 15, 1932 |
| 1,922,167 | Leray | Aug. 15, 1933 |
| 2,074,342 | Platt | Mar. 23, 1937 |
| 2,086,802 | Hays | July 13, 1937 |
| 2,096,599 | Thomas | Oct. 19, 1937 |
| 2,378,617 | Burke | June 19, 1945 |
| 2,383,038 | Bossi | Aug. 21, 1945 |

FOREIGN PATENTS

| Number | Country | Date |
|---|---|---|
| 476,598 | Great Britain | Dec. 13, 1937 |